United States Patent
Lundén et al.

(10) Patent No.: US 12,425,888 B2
(45) Date of Patent: Sep. 23, 2025

(54) ANALYZING OPERATION OF CELLS OF A COMMUNICATIONS NETWORK

(71) Applicant: Elisa Oyj, Helsinki (FI)

(72) Inventors: Petteri Lundén, Helsinki (FI); Adriana Chis, Helsinki (FI)

(73) Assignee: Elisa Oyj, Helsinki (FI)

( * ) Notice: Subject to any disclaimer, the term of this patent is extended or adjusted under 35 U.S.C. 154(b) by 329 days.

(21) Appl. No.: 18/267,151

(22) PCT Filed: Nov. 29, 2021

(86) PCT No.: PCT/FI2021/050821
§ 371 (c)(1),
(2) Date: Jun. 14, 2023

(87) PCT Pub. No.: WO2022/129678
PCT Pub. Date: Jun. 23, 2022

(65) Prior Publication Data
US 2024/0098529 A1    Mar. 21, 2024

(30) Foreign Application Priority Data
Dec. 17, 2020    (FI) .................................... 20206320

(51) Int. Cl.
*H04W 24/04*    (2009.01)
*H04L 41/142*    (2022.01)

(52) U.S. Cl.
CPC ........... *H04W 24/04* (2013.01); *H04L 41/142* (2013.01)

(58) Field of Classification Search
CPC .............................. H04W 24/04; H04L 41/142
See application file for complete search history.

(56) References Cited

U.S. PATENT DOCUMENTS

| 8,156,421 B2 | 4/2012 | Chhajer et al. |
| 9,031,561 B2 | 5/2015 | Nuss et al. |

(Continued)

FOREIGN PATENT DOCUMENTS

| FI | 20195094 A1 | 8/2020 |
| WO | 2020173470 A1 | 9/2020 |

OTHER PUBLICATIONS

European Patent Office, International Search Report and Written Opinon of the International Searching Authority, Application No. PCT/FI2021/050821, mailed Feb. 28, 2022, 14 pages.

(Continued)

*Primary Examiner* — Wayne H Cai
(74) *Attorney, Agent, or Firm* — ZIEGLER IP LAW GROUP, LLC.

(57) ABSTRACT

A computer implemented method for analyzing operation of cells of a communications network is provided. The method includes: obtaining data comprising performance indicators data from a first cell and a group of reference cells for a selected time period;—identifying, for the first cell, first change point of a first performance indicator, calculating magnitude of the change of the first performance indicators at the first change point, and defining the calculated magnitude as a first magnitude; identifying, for the group of reference cells, a group of reference change points of the first performance indicator, calculating magnitudes of the changes of the group of reference change points, and defining the calculated magnitudes as a group of reference magnitudes; comparing the first magnitude to the group of reference magnitudes to determine the relevance of the change point of the first cell; and providing output indicating the first change point of the first cell in response to detecting that said change point is determined relevant, or otherwise, (Continued)

providing output indicating that no relevant change points are identified.

15 Claims, 3 Drawing Sheets

(56) References Cited

U.S. PATENT DOCUMENTS

| | | |
|---|---|---|
| 10,693,575 B2 | 6/2020 | Jana et al. |
| 2017/0094537 A1 | 3/2017 | Yang et al. |
| 2018/0160327 A1 | 6/2018 | Garcia et al. |
| 2020/0382361 A1 | 12/2020 | Chandrasekhar et al. |
| 2023/0308906 A1* | 9/2023 | Báder .................. H04W 24/02 |

OTHER PUBLICATIONS

Finnish Patent and Registration Office, Office Action, Application No. 20206320, mailed Jun. 28, 2021, 5 pages.
Finnish Patent and Registration Office, Search Report, Application No. 20206320, Dated Jun. 28, 2021, 1 page.

* cited by examiner

310: Obtaining data comprising performance indicator data from a first cell and a group of reference cells for a selected time period.

320: Identifying, for the first cell, first change point of a first performance indicators, calculating magnitude of the change of the first performance indicator at the first change point, and defining the calculated magnitude as a first magnitude.

330: Identifying, for the group of reference cells, a group of reference change points of the first performance indicators, calculating magnitudes of the changes of the group of reference change points, and defining the calculated magnitudes as a group of reference magnitudes.

340: Comparing the first magnitude to the group of reference magnitudes to determine the significance of the change point of the first cell.

350: Providing output based on the comparison of the change point magnitudes.

ANALYZING OPERATION OF CELLS OF A COMMUNICATIONS NETWORK

TECHNICAL FIELD

The present disclosure generally relates to analysis of operation of cells of a communications network.

BACKGROUND

This section illustrates useful background information without admission of any technique described herein representative of the state of the art.

Cellular communications networks are complex systems comprising a plurality of cells serving users of the network. There are various factors that affect operation of individual cells and co-operation between the cells. In order for the communications network to operate as intended and to provide planned quality of service, cells of the communications network need to operate as planned. For example, the cells need to provide sufficient coverage and throughput without interfering with the neighboring cells.

There are various automated measures that monitor operation of the communication networks in order to detect problems as soon as possible so that corrective actions can be taken. The challenge is that there are malfunctions that are not detected by current automated monitoring arrangements and therefore there is room for further development of the automated monitoring arrangements.

Now a new approach is taken to analyzing operation of cells of a communications network.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the present disclosure.

According to a first example aspect there is provided a computer implemented method for analyzing operation of cells of a communications network. The method comprises: obtaining data comprising performance indicators data from a first cell and a group of reference cells for a selected time period; identifying, for the first cell, a first change point of first performance indicators, calculating magnitude of the change of the first performance indicators at the first change point, and defining the calculated magnitude as a first magnitude; identifying, for the group of reference cells, a group of reference change points of the first performance indicators, calculating magnitudes of the changes of the group of reference change points, and defining the calculated magnitudes as a group of reference magnitudes; comparing the first magnitude to the group of reference magnitudes to determine the relevance of the change point of the first cell; and providing output indicating the first change point of the first cell in response to detecting that said change point is determined relevant, or otherwise, providing output indicating that no relevant change point is identified.

In an embodiment, multiple change points of the first performance indicators are identified and analyzed for the first cell.

In an embodiment, the change point is identified using methods comprising at least one of: a binary segmentation algorithm, the Pruned Exact Linear Time, PELT, algorithm, and Z-score based method.

In an embodiment, the value of the first performance indicators degrades at the change point.

In an embodiment, the magnitude of the change at the change point is determined based on an absolute difference or a relative difference of the performance indicators.

In an embodiment, the magnitude of the change at the change point is calculated as a difference of mean values or as a difference of standard deviation values of the performance indicators before and after the change point.

In an embodiment, the relevance of the first change point is determined based on one or more of the following: absolute mean, relative mean, absolute standard deviation, and relative standard deviation of the performance indicator.

In an embodiment, the relevance of the change point is determined based on the magnitude of the first change point being equal to or higher than top values of the group of reference magnitudes, wherein the top values of the group of reference magnitudes comprises a selected percentile of the highest values of the group of reference magnitudes.

In an embodiment, the relevance of the first change point is determined based on clustering the first magnitude and the group of reference magnitudes and classifying outliers compared to the cluster as relevant change points.

In an embodiment, the analysis is performed for multiple different performance indicators.

In an embodiment, the performance indicators data comprises at least one of: throughput, cell availability, handover, reference signal received power, RSRP, reference signal received quality, RSRQ, received signal strength indicator, RSSI, signal to noise ratio, SNR, signal to interference plus noise ratio, SINR, received signal code power, RSCP, and channel quality indicator, CQI.

In an embodiment, the group of reference cells comprises cells which are similar to the first cell.

In an embodiment, the similarity is defined as similarity in one or more of: network density, frequency band, historical performance indicators correlation, historical performance indicator statistics, cell technology, cell size, antenna technology, base station location, and base station surroundings.

In an embodiment, the first cell and the time period are selected based on a user feedback and/or an alarm form a network monitoring system.

In an embodiment, the analysis is repeated for multiple cells of the communications network.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect there is provided a computer program comprising computer executable program code which when executed by at least one processor causes an apparatus at least to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION

Some example embodiments will be described with reference to the accompanying figures, in which.

DETAILED DESCRIPTION

In the following description, like reference signs denote like elements or steps.

Example embodiments of the present disclosure provide new methods for analyzing operation of cells of a communications network in order to identify anomalously operating cells. Certain example embodiments of the present disclosure are based on identifying change points of performance indicators of a cell. The performance indicators are a time series of performance indicator data points collected at regular time intervals, e.g., hourly or daily samples over a selected time period. The selected time period may be of 30, 60, 90 days, or of other duration. A change point represents a point in time which marks a significant change in statistics, e.g., mean or standard deviation of the performance indicators time series. Alternatively, it can be interpreted as a shift in data. In order to determine the relevance of the identified change points, the identified change points may be compared to change points of said performance indicators identified form a group of reference cells. That is, performance of cell that is being analyzed is compared with performance in one or more reference cells. A change point which is determined to be relevant may indicate that the cell is anomalous. As a consequence of detecting an anomaly, further analysis or corrective actions can be applied to the cell.

Figure 1:
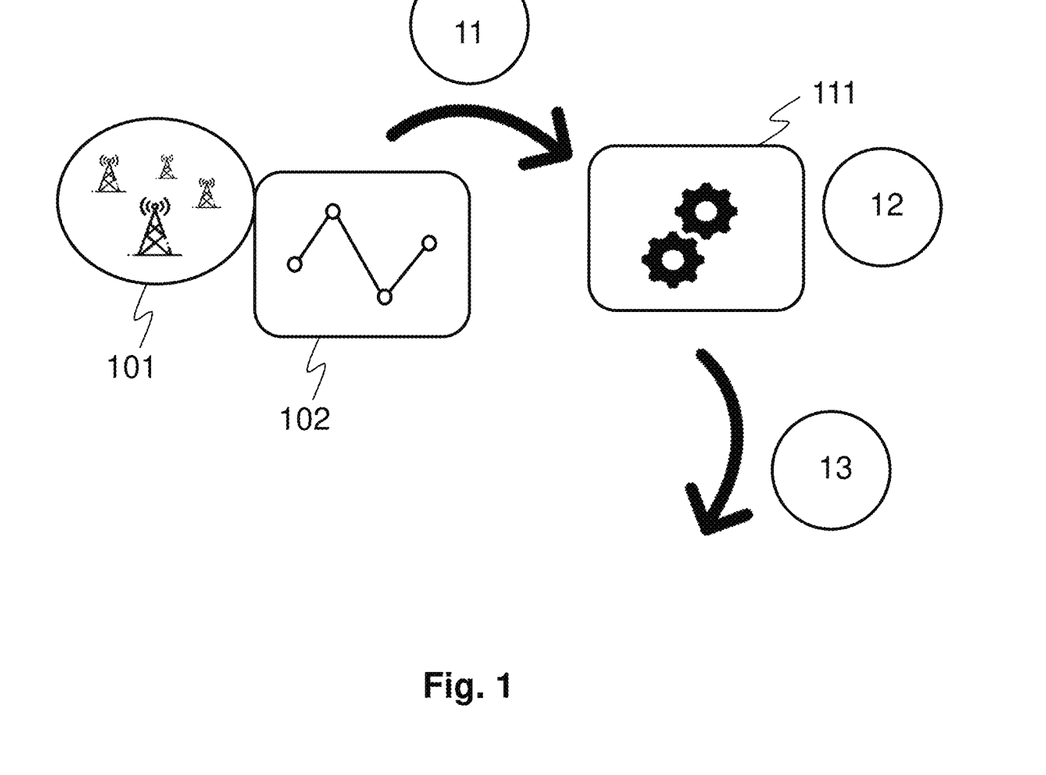
FIG. 1 shows an example scenario according to an embodiment.

FIG. 1 shows an example scenario according to an embodiment. The scenario shows a communications network 101 comprising a plurality of cells and base stations and other network devices, and an operations support system (OSS) 102 that manages operations of the communications network 101. Further, the scenario shows an automation system 111 configured to control the communications network according to example embodiments.

In an embodiment of the present disclosure the scenario of FIG. 1 operates as follows:

In phase 11, the automation system 111 obtains data from the OSS 102. The data comprises at least performance indicators of some cells. The data may comprise data related to one base station site or data related to a plurality of base station sites. Other data may as well be obtained from the OSS 102.

In phase 12, the automation system 111 processes the data from the OSS to identify change points of selected performance indicators of a selected cell of the communications network 101 during a selected time period. After identifying said change point of the selected cell, the magnitude of the change point is compared to change point magnitudes of reference cells to determine the relevance of said change point.

In phase 13, in response to detecting a relevant change point in performance indicators of a cell, possibly indicating an anomaly in the cell, a further investigation of the cell or maintenance actions may be initiated.

The process may be manually or automatically triggered. The process may be triggered by user feedback. The process may be periodically repeated. The process may be repeated for example once a day, once a week, every two weeks, or once a month. By periodically repeating the process, effective network monitoring and controlling is achieved and problems, if any, may be timely detected. Additionally or alternatively, the process may be triggered, for example, in response to reported problems in the network. Problems may be reported for example by users through making a service complaint. Still further, the process may be performed in connection with deployment of new cell(s) or base station site, deployment of new physical equipment in the base station site and/or maintenance actions performed in the base station site. In this way any problems with the newly deployed equipment may be detected right away.

Figure 2:
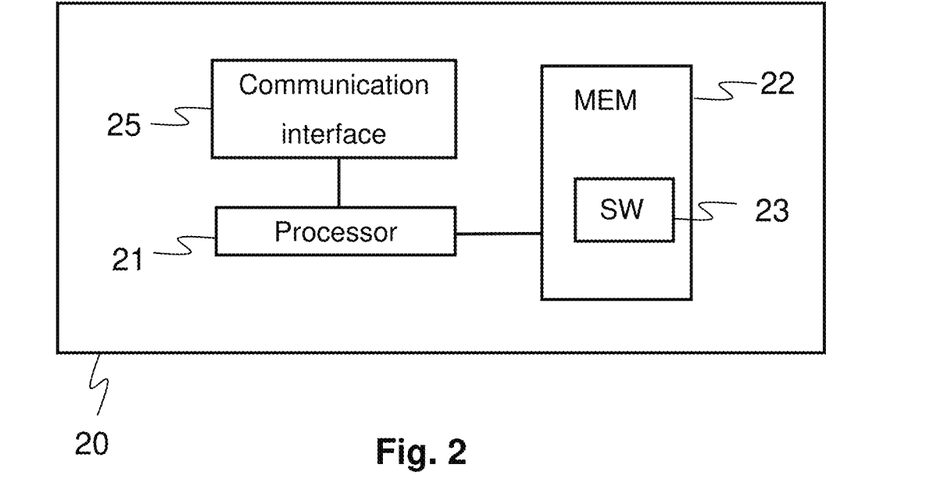
FIG. 2 shows an apparatus according to an embodiment.

FIG. 2 shows an apparatus 20 according to an embodiment. The apparatus 20 is for example a general-purpose computer or server or cloud computing environment or some other electronic data processing apparatus. The apparatus 20 can be used for implementing embodiments of the present disclosure. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the present disclosure may equally be implemented in a cluster of shown apparatuses.

Figure 3:
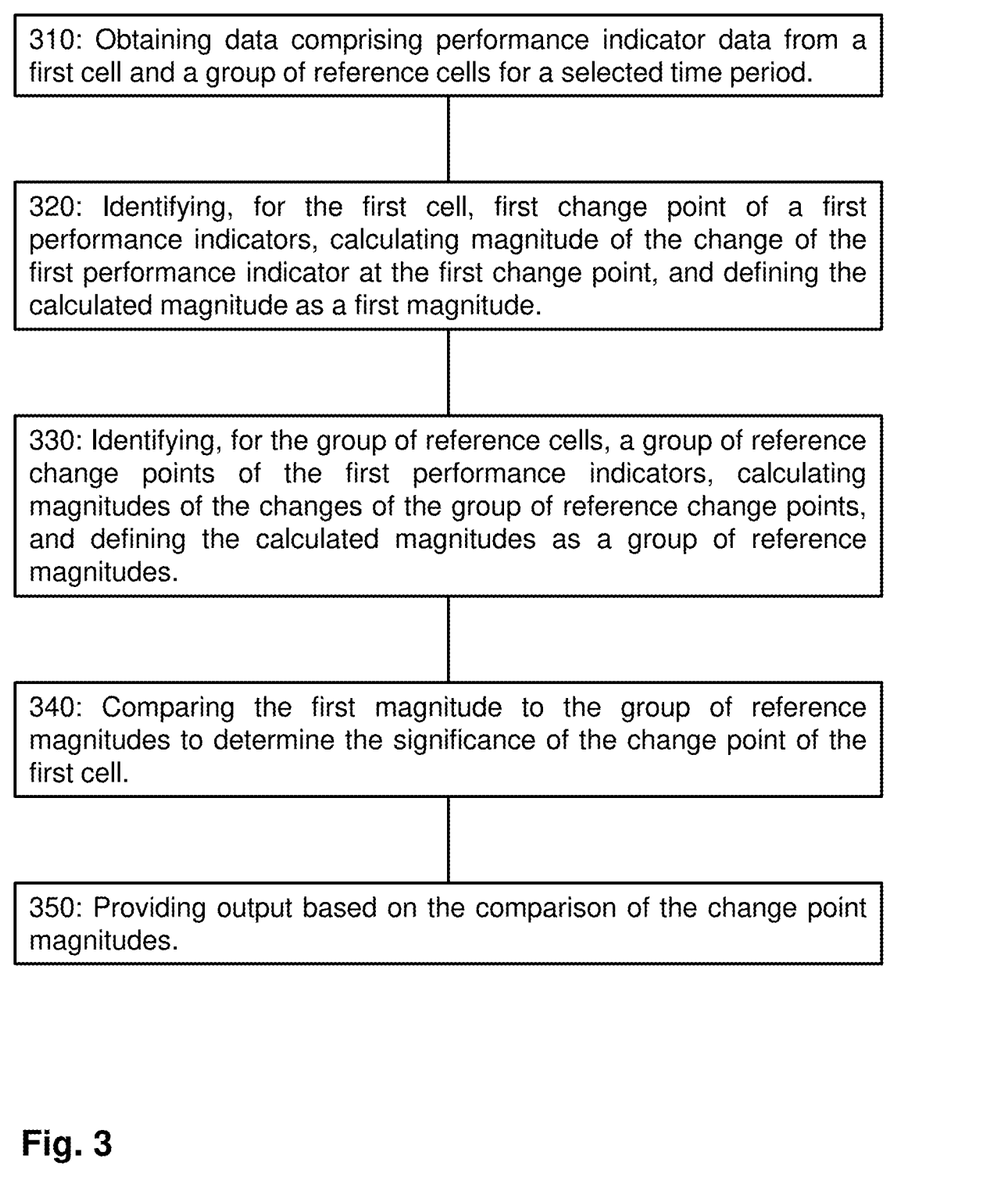
FIG. 3 shows a flow chart of a method according to an example embodiment.

FIG. 3 shows a flow chart of a method according to an example embodiment. FIG. 3 illustrates a computer implemented method for analyzing operation of cells of a communications network comprising various possible process steps including some optional steps while also further steps can be included and/or some of the steps can be performed more than once:

310: Obtaining data comprising performance indicators data from a first cell and a group of reference cells for a selected time period. The performance indicators data may comprise at least one of: throughput, cell availability, handover failure or success rate, reference signal received power, RSRP, reference signal received quality, RSRQ, received signal strength indicator, RSSI, signal to noise ratio, SNR, signal to interference plus noise ratio, SINR, received signal code power, RSCP, and channel quality indicator, CQI. Alternatively or additionally, other performance indicators data may be used. In an embodiment, the performance indicators data may comprise other type of network event data or network counter data. The group of reference cells may comprise cells which are similar to the first cell. In an embodiment, the similarity is defined as one or more of: similar network density (e.g. urban and rural deployment typically have very different base station densities), frequency band, historical performance indicator correlation, historically similar performance indicator statistics (such as mean and standard deviation), cell technology, cell size, antenna technology, base station location (such as indoor vs. outdoor), and base station surroundings. In an example embodiment, the first cell and the time period are selected based on user feedback. The feedback may be a customer ticket appointing a problem. The time period may be selected such that performance indicators data is obtained before the occurrence of the appointed problem. Alternatively, the time period may be selected such that performance indicators data is obtained before and after the occurrence of the appointed problem. The time period may be for example 30 days, 60 days, 90 days, or other duration. In another embodiment, an alarm from a network monitoring system indicates the first cell, the time period, and the performance indicators data in the time period of analysis. In an example embodiment, the first cell can be indicated by a user or based on an alarm, and the time period is indicated by a user based on expert knowledge or some statistical analysis methods may automatically indicate the right period.

320: Identifying, for the first cell, a first change point of first performance indicators, calculating magnitude of the change in the first performance indicators at the first change point, and defining the calculated magnitude as a first magnitude. In an example embodiment, the change point is identified using a binary segmentation algorithm. Alternatively, methods comprising the Pruned Exact Linear Time (PELT) algorithm and Z-score based method may be used for detecting the change point. Also other methods may be used for detecting the change point. In an embodiment, a change point having the highest magnitude of the change is identified as the first change point. In some embodiments, only change points indicating degradation in performance indicators values may be used for analysis.

The magnitude of the change at the change point may be determined based on an absolute difference in values of the performance indicators. Alternatively or additionally, the magnitude can be measured using a relative difference. The magnitude of the change at the change point may be calculated as a difference of mean values of the performance indicators before and after the change point. Alternatively or additionally, a difference in standard deviation values of the performance indicators before and after the change point can be used to calculate the magnitude of the change point.

The absolute difference of the mean values may be calculated as $$ABS_{mean}=KPI_{mean}^{after}-KPI_{mean}^{before},$$

where $KPI_{mean}^{after}$ is the mean value of the performance indicators after the change point and $KPI_{mean}^{before}$ is the mean value of the performance indicators before the change point.

The absolute difference of the standard deviation values may be calculated as $$ABS_{std}=KPI_{std}^{after}-KPI_{std}^{before},$$

where $KPI_{std}^{after}$ is the standard deviation value of the performance indicators after the change point and $KPI_{std}^{before}$ is the standard deviation value of the performance indicators before the change point.

The relative differences of the mean values and the standard deviation values may be calculated as $$REL_{mean}=sgn(KPI_{mean}^{after}-KPI_{mean}^{before})*|100-(KPI_{mean}^{after}/KPI_{mean}^{before}*100)|$$

and $$REL_{std}=sgn(KPI_{std}^{after}-KPI_{std}^{before})*|100-(KPI_{std}^{after}/KPI_{std}^{before}*100)|.$$

In an example embodiment, multiple performance indicators may be analyzed for identifying the change points. In an example embodiment, a change point in just one performance indicators may be considered less relevant (and less likely to point to a significant network problem requiring further action) than approximately simultaneously occurring change point in multiple performance indicators of the same cell. In an example embodiment, multiple change points may be identified for the first cell.

330: Identifying, for the group of reference cells, a group of reference change points of the first performance indicators, calculating magnitudes of the changes of the group of reference change points, and defining the calculated magnitudes as a group of reference magnitudes. In an embodiment, multiple change points may be identified at least for some cells of the group of reference cells. In some embodiments, change points may be identified for some of the cells of the group of reference cells. In some embodiments, the magnitudes of the changes of the group of reference change points are calculated similarly as the magnitude of the first change point of the first cell. In an example embodiment, multiple performance indicators may be analyzed for identifying the change points.

In an example embodiment, the reference change points of the first performance indicators are selected so that if the performance indicators of a cell have multiple change points within the observed time window, only the one with the largest magnitude is selected to the reference set.

340: Comparing the first magnitude to the group of reference magnitudes to determine the relevance of the change point of the first cell. The relevance of the change point is determined based on at least one of the following: absolute mean, relative mean, absolute standard deviation, and relative standard deviation of the performance indicator. In some example embodiments, the relevance of the change point may also be determined based on other statistical quantities. In an example embodiment, multiple performance indicators are compared simultaneously in order to determine the relevance of the change point. In an example embodiment, the relevance of the first change point is determined based on comparing the magnitude of the first change point to the group of reference magnitudes. The first change point may be determined relevant if its magnitude is higher than any of the values of the group of reference magnitudes. The first change point may be determined relevant if its magnitude is higher than 95% of the values of the group of reference magnitudes. Alternatively the first change point may be determined relevant if its magnitude is higher than 90%, 92.5%, 97.5%, or other percentile values of the group of reference magnitudes.

In an example embodiment, the relevance of the change point is determined based on clustering the first magnitude and the group of reference magnitudes and classifying the outliers of the main cluster as relevant change points. The clustering may be performed in a single dimension space comprising one measure of magnitude of the change points: absolute difference in mean, relative difference in mean, absolute difference in standard deviation, relative difference in standard deviation of performance indicators. In an example embodiment, the clustering is performed in a multidimensional space comprising two or more measures of magnitude: absolute mean, relative mean, absolute standard deviation, and relative standard deviation of the performance indicator.

350: Providing output based on the comparison of the change point magnitudes. The output may indicate the first change point of the first cell in response to detecting that said change point is determined relevant. In response to detecting that the first change point is irrelevant, output indicating that no relevant change points were identified may be provided. In a yet another alternative, the output provides results of the comparison phase and further analysis of the comparison results may be performed elsewhere.

In an example embodiment, multiple change points of the first performance indicators are identified and analyzed for the first cell simultaneously or sequentially. The analysis may be performed for multiple cells of the communications network simultaneously or sequentially. In an example embodiment, the analysis may be performed for a group of cells covering a particular area indicated in the customer feedback, or for example where a software update or a network parameter change has been applied. In another example embodiment, the performance indicators apply and are computed for a group of cells (such as cells served by the same base station). In such a case also the reference set can comprise of similarly grouped cells.

Figure 4A:
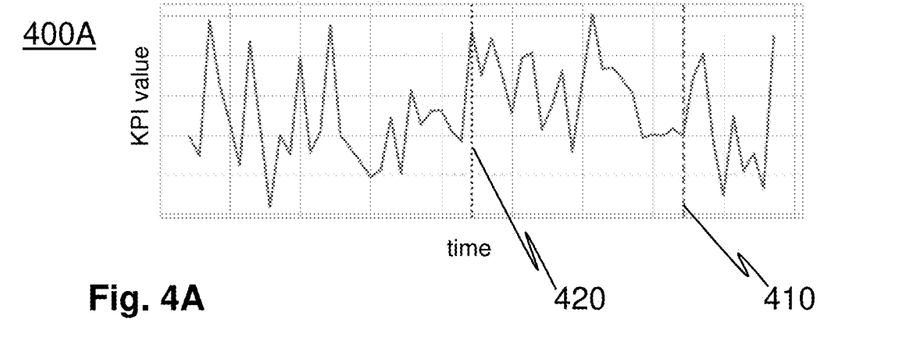
FIGS. 4A-4C show an example according to an embodiment.
Figure 4B:
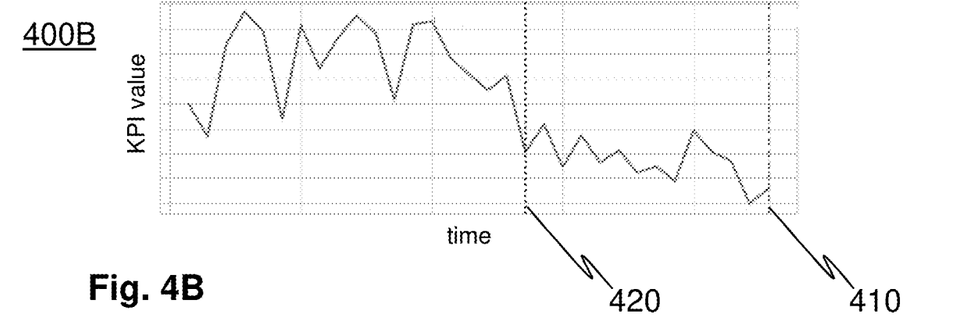
Figure 4C:
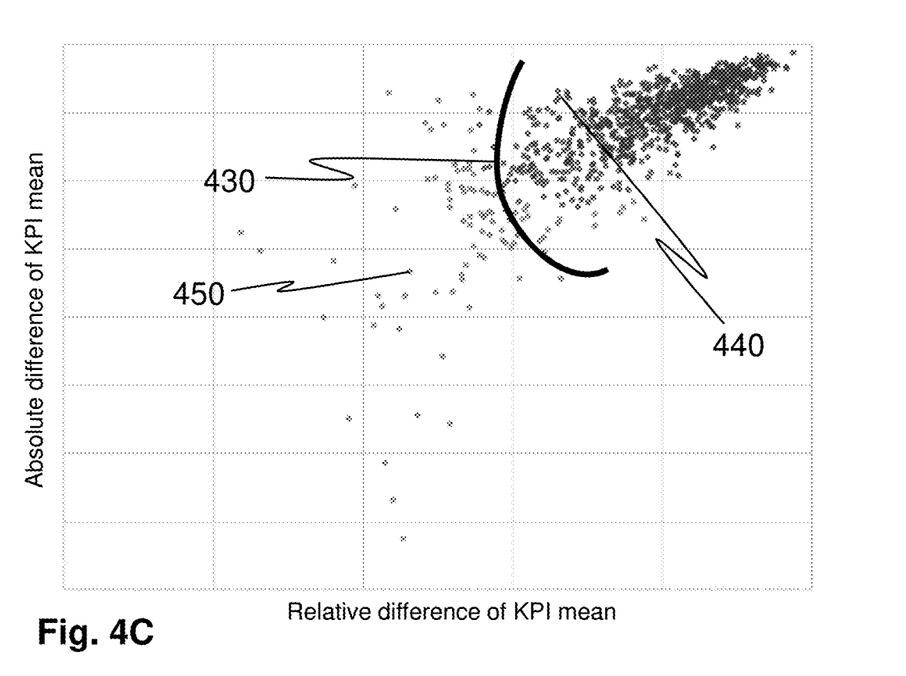

FIGS. 4A-4C show an example according to an embodiment. FIGS. 4A-4B show obtained performance indicators data of a first performance indicator according to step 310 for two different cells 400A and 400B. The cell analysis in both cases 400A-B is initiated by a user complaint that generated ticket 410 in the system. Due to the received user ticket 410, the time period for analysis, or an analysis window, is selected to mainly cover time before the user ticket 410 as shown in FIGS. 4A-4B. Then, the change point 420 is identified and the magnitude of the change is calculated according to step 320 for both cells 400A and 400B. In this example, cells 400A and 400B are similar according to a specified criterion of similarity so that the same group of reference cells can be used for the analysis. The change points of the group of reference cells are then identified according to step 330. The relevance of the change points 420 of cells 400A and 400B is determined at step 340 using a clustering method as shown in FIG. 4C. The dots in FIG. 4C indicate the magnitude of the change points of the first performance indicators identified for cells 400A and 400B and for the group of reference cells. In the shown example two-dimensional clustering analysis is performed using change in absolute mean and relative mean values. In some other examples, the clustering may be performed in four dimensions including also change in absolute and relative standard deviation values. Curve 430 in FIG. 4C indicates an approximate clustering border. In FIG. 4C, data points towards the top-right corner form the curve 430 are considered normal, while rest of the data points may be considered anomalous (they are more separated from other data points, whereas the points within the cluster of normal points are less separated from one another). Thus, the magnitude of the change point 440 of cell 400A indicates that the change point 420 of cell 400A is not relevant or such that it does not indicate a problem in the cell. However, the magnitude of change point 450 of cell 400B indicates that change point 420 of cell 400B is relevant and shows a deterioration of performance indicator value likely caused by a problem in the cell or the network. Consequently, operation of cell 400B is classified as anomalous and further investigations, maintenance, or corrective actions may be initiated for cell 400B. Since operation of cell 400A is classified normal, no further actions are presently required for cell 400A.

In the context of this method, clustering has the role of differentiating between the datapoints showcasing measures of magnitudes of the change points that are alike or similar in values, forming the main cluster and denoting the normal behavior of the cell population and the outliers. The outliers are the datapoints that are falling outside the main clusters and likely to indicate anomalies in the respective cells' operations. There are various clustering algorithms that could be used, the one used in the example of FIG. 4 is Isolation Forest. Other alternatives comprise for example PCA (principal component analysis) based methods and (H)DBSCAN (hierarchical density-based spatial clustering of applications with noise).

The embodiments of the present disclosure provide automated methods for analyzing operation of cells of a communications network. An advantage provided by the embodiments is that the efficiency of network problem resolution may be improved. This is due to narrowing down the list of identified anomalous cells shown to a level that is manageable to the end user, i.e., only cells with relevant change points in their performance indicators are indicated or highlighted to the administration personnel of the network. Thus, maintenance actions may be initiated faster for the most significant issues. Further, automatic maintenance actions may be enabled as certainty of identifying true and significant problems increases. A further advantage is that automatic processing enables continuous network-wide cell monitoring through monitoring performance indicators data. Yet another advantage is that a proactive approach for finding and resolving network faults may be provided, instead of waiting for user complaints to react to.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the solutions of the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A computer implemented method for analyzing operation of cells of a communications network, the method comprising:
    obtaining data comprising performance indicators data from a first cell and a group of reference cells for a selected time period;
    identifying, for the first cell, a first change point of first performance indicators, calculating magnitude of the change of the first performance indicators at the first change point, and defining the calculated magnitude as a first magnitude;
    identifying, for the group of reference cells, a group of reference change points of the first performance indicators, calculating magnitudes of the changes of the group of reference change points, and defining the calculated magnitudes as a group of reference magnitudes;
    comparing the first magnitude to the group of reference magnitudes to determine the relevance of the change point of the first cell; and
    providing output indicating the first change point of the first cell in response to detecting that said change point is determined relevant, or otherwise, providing output indicating that no relevant change points are identified.

2. The method according to claim 1, wherein, for the first cell, multiple change points of the first performance indicators are identified and analyzed.

3. The method of claim 1, wherein the change point is identified using methods comprising at least one of: a binary segmentation algorithm, the Pruned Exact Linear Time, PELT, algorithm, and Z-score based method.

4. The method of claim 1, wherein the magnitude of the change at the change point is determined based on an absolute difference or a relative difference of the performance indicator.

5. The method of claim 1, wherein the magnitude of the change at the change point is calculated as a difference of mean values or as a difference of standard deviation values of the performance indicators before and after the change point.

6. The method of claim 1, wherein the relevance of the first change point is determined based on one or more of the following: absolute mean, relative mean, absolute standard deviation, and relative standard deviation of the performance indicator.

7. The method of claim 1, wherein the relevance of the change point is determined based on the magnitude of the first change point being equal to or higher than top values of the group of reference magnitudes, wherein the top values of the group of reference magnitudes comprises a selected percentile of the highest values of the group of reference magnitudes.

8. The method of claim 1, wherein the relevance of the first change point is determined based on clustering the first magnitude and the group of reference magnitudes and classifying outliers compared to the cluster as relevant change points.

9. The method of claim 1, wherein the analysis is performed for multiple different performance indicators.

10. The method of claim 1, wherein the performance indicators data comprises at least one of: throughput, cell availability, handover, reference signal received power, RSRP, reference signal received quality, RSRQ, received signal strength indicator, RSSI, signal to noise ratio, SNR, signal to interference plus noise ratio, SINR, received signal code power, RSCP, and channel quality indicator, CQI.

11. The method of claim 1, wherein the group of reference cells comprises cells which are similar to the first cell.

12. The method of claim 11, wherein the similarity is defined as similarity in one or more of: network density, frequency band, historical performance indicators correlation, historical performance indicator statistics, cell technology, cell size, antenna technology, base station location, and base station surroundings.

13. The method of claim 1, wherein the first cell and the time period are selected based on user feedback and/or an alarm form a network monitoring system.

14. An apparatus comprising
    a processor, and
    a memory including computer program code; the memory and the computer program code configured to, with the processor, cause the apparatus to perform
    analyzing operation of cells of a communications network;
    obtaining data comprising performance indicators data from a first cell and a group of reference cells for a selected time period;
    identifying, for the first cell, a first change point of first performance indicators, calculating magnitude of the change of the first performance indicators at the first change point, and defining the calculated magnitude as a first magnitude;
    identifying, for the group of reference cells, a group of reference change points of the first performance indicators, calculating magnitudes of the changes of the group of reference change points, and defining the calculated magnitudes as a group of reference magnitudes;
    comparing the first magnitude to the group of reference magnitudes to determine the relevance of the change point of the first cell; and
    providing output indicating the first change point of the first cell in response to detecting that said change point is determined relevant, or otherwise, providing output indicating that no relevant change points are identified.

15. A computer program product comprising non-transitory computer executable program code which when executed by a processor causes an apparatus to perform
- analyzing operation of cells of a communications network;
- obtaining data comprising performance indicators data from a first cell and a group of reference cells for a selected time period;
- identifying, for the first cell, a first change point of first performance indicators, calculating magnitude of the change of the first performance indicators at the first change point, and defining the calculated magnitude as a first magnitude;
- identifying, for the group of reference cells, a group of reference change points of the first performance indicators, calculating magnitudes of the changes of the group of reference change points, and defining the calculated magnitudes as a group of reference magnitudes;
- comparing the first magnitude to the group of reference magnitudes to determine the relevance of the change point of the first cell; and
- providing output indicating the first change point of the first cell in response to detecting that said change point is determined relevant, or otherwise, providing output indicating that no relevant change points are identified.

* * * * *